United States Patent

Henning

[15] 3,675,505
[45] July 11, 1972

[54] SAFETY STEERING WHEEL FOR POWER VEHICLES

[72] Inventor: Bodo Henning, Braunschweig, Germany
[73] Assignee: Volkswagenwerk Aktiengesellschaft, Wolfsburg, Germany
[22] Filed: Jan. 22, 1970
[21] Appl. No.: 4,855

[30] Foreign Application Priority Data

March 12, 1969 Germany ............... P 19 12 528.1

[52] U.S. Cl. .................................................. 74/552
[51] Int. Cl. .................................................. B62d 1/04
[58] Field of Search ............................ 74/552, 492, 493

[56] References Cited

UNITED STATES PATENTS

| | | | |
|---|---|---|---|
| 3,482,466 | 12/1969 | Orlich et al. | 74/492 |
| 3,016,764 | 1/1962 | Fredericks et al. | 74/552 |
| 3,270,581 | 9/1966 | Geller | 74/552 |
| 3,373,629 | 3/1968 | Wight et al. | 74/492 |
| 3,434,367 | 3/1969 | Renneker et al. | 74/492 |
| 3,440,897 | 4/1969 | Dutt et al. | 74/552 |

*Primary Examiner*—Milton Kaufman
*Assistant Examiner*—F. D. Shoemaker
*Attorney*—Watson, Cole, Grindle & Watson

[57] ABSTRACT

A safety steering wheel is provided with a deformable member constructed from a flat sheet of metal having rhombic shaped holes cut therein by rolling the latter to form a cylinder. The deformable member is disposed atop the hub of the wheel between the hub and the operator and it is capable of being deformed laterally as well as axially to absorb shocks.

2 Claims, 3 Drawing Figures

PATENTED JUL 11 1972    3,675,505

INVENTOR
Bodo Henning
BY
Watson, Cole, Grindle + Watson
Attys.

SAFETY STEERING WHEEL FOR POWER VEHICLES

This invention relates to a safety steering wheel provided with a deformable member which is capable of collapsing in case of an accident. In particular the deformable member is disposed between the hub of the wheel and the operator and comprises a tube-like member capable of being deformed laterally as well as axially to absorb shocks.

Safety steering wheels often include deformable members operable upon a violent impact against the steering wheel by the driver to deform and absorb the shock of the impact and thereby prevent or minimize the occurrence of serious injury. In previously known deformable joints, tubular forms having small diameters have often been used so that the view on to the front mounting was not obscured. Such tubular deformable members must necessarily be made of thin sheet material to function properly and this, of course, adds to the difficulty of securing the joint to the hub. During soldering or welding operations, thin metal objects can easily be weakened and damaged by the heat. With bolts or screws, sharp edges often result rendering the joint unsafe.

The foregoing difficulties may be avoided by the present invention as constructed from a flat sheet of metal having rhombic shaped holes cut therein. The sheet is rolled into a cylindrical form and the edges are connected to form a structure comprising a plurality of helicoid bands one set of which spiral in one direction while another set spirals in the opposite direction. The crossing points of oppositely spiraling bands are integral and are uniformly distributed over the entire periphery of the member. The material from which the member is made may be a comparatively thick sheet of material to render it more resistant to heat and thereby facilitate its construction and use. The rhombic shape of the holes not only simplifies the formation of the member but also enhance its shock absorbing characteristics.

Further objects will be apparent from the following description when considered in connection with the accompanying drawing in which.

Figure 1:
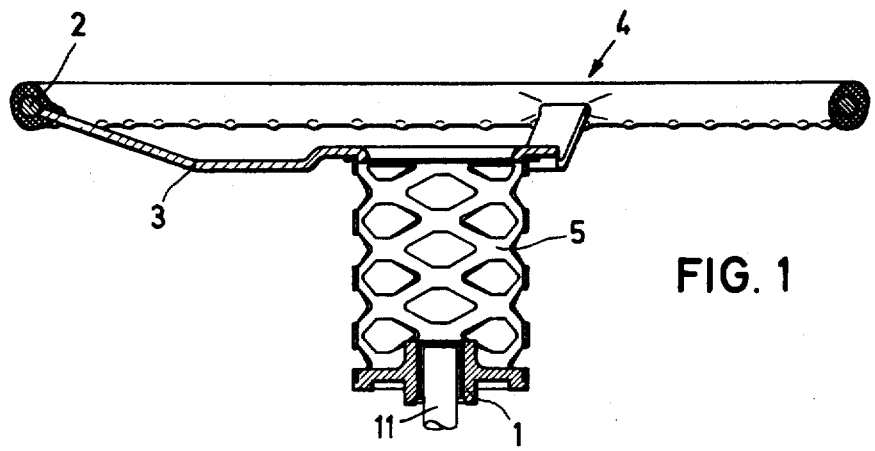
FIG. 1 is a vertical, cross sectional view of a safety steering wheel constructed in accordance with the principles and concepts of the present invention.
Figure 3:
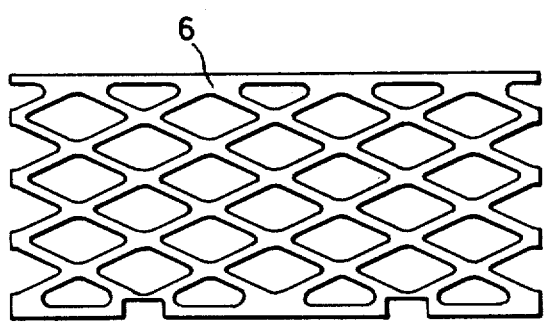
FIG. 3 is a plan view of a flat sheet of material which can be rolled to form a deformable member useful in connection with the present invention.

In FIG. 1, hub 1 is mounted on a steering column 11 and spokes 3 are secured to the rim 2 of a steering wheel 4. A deformable member 5 is axially aligned with column 11 and interconnects spokes 3 and hub 1. Deformable member 5, comprises a tubular member which has been constructed by rolling a flat metal sheet 6. Sheet 6 is shown in FIG. 3 in its unrolled condition.

Figure 2:
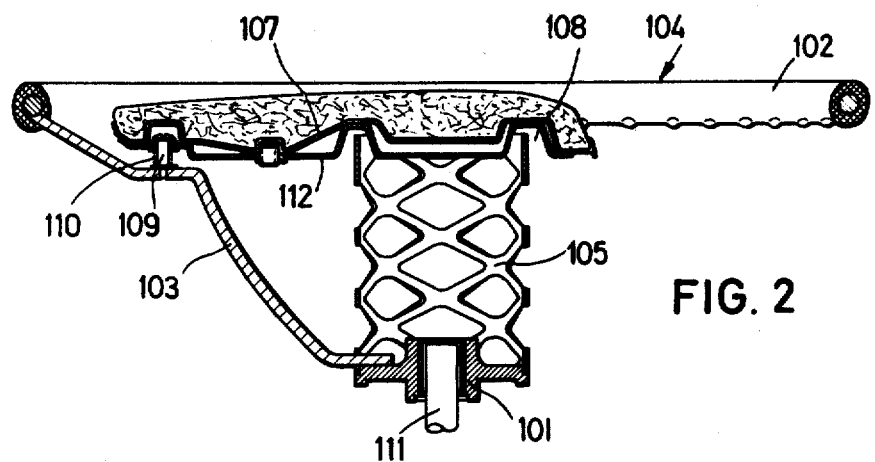
FIG. 2 is a vertical, cross-sectional view of another safety steering wheel constructed in accordance with the principles and concepts of the invention.

In the embodiment of FIG. 2, bowl-shaped member 103 interconnects the rim 102 and hub 101 of a steering wheel 104. Hub 101 is mounted atop a steering column 111. Deformable member 105 is attached to hub 101 by means of welding or soldering and its upper end is disposed in slightly spaced relationship relative to a padded shock absorbing body 107. Body 107 is mounted on a base 112 having a ring-shaped corrugation 108 disposed to receive and guide the upper end of deformable member 105 in the event body 107 is forced thereinto during a collision. In order to operate a horn, base 112 may be secured resiliently to member 103 by means of bolts 109 and spring 110. Manifestly, member 105 is also constructed by rolling flat metal sheet 6.

I claim:

1. A safety steering wheel for power vehicles comprising a hub for a steering column, a rim, means interconnecting the rim and the hub, a generally cylindrical deformable member connected to the upper side of said hub in axial alignment therewith, said member being constructed of sheet metal having rhombic shaped holes cut therein to present a lattice-like structure comprising a plurality of helicoid bands, there being one set of said bands spiraling in one direction and another set of bands spiraling in the opposite direction about said structure, the crossing points of the bands being integral and uniformly distributed over the entire periphery of the member, and a shock receiving member mounted on said interconnecting means in spaced overlying relationship relative to said deformable member.

2. A safety steering wheel as set forth in claim 1, there being a pad mounted on top of said shock receiving member.

* * * * *